Patented July 6, 1954

2,683,154

UNITED STATES PATENT OFFICE 2,683,154

INSOLUBLE METALLO-ORGANIC COMPOUNDS

Charles A. Kumins, Tuckahoe, N. Y., assignor to Interchemical Corporation, New York, N. Y., a corporation of Ohio No Drawing. Application October 10, 1951,
Serial No. 250,811

7 Claims. (Cl. 260—414)

This invention relates to new metallo-organic compounds containing iron, which are particularly useful as pigments, and to their manufacture.

In U. S. patent application, Serial No. 104,818, now U. S. Patent No. 2,575,347, there is disclosed a method for making new iron compounds. That method comprises reacting ferric hydroxide with an acid of the group consisting of naphthenic acids and fatty acids having at least four carbon atoms, or ammonium soaps of such acids, in a reaction medium comprising an organophile-hydrophile compound, under such conditions that new ferro-organic pigments are formed. The pigment formation is visualized as the reaction of one mole of such acid or ammonium soap with one mole of ferric hydroxide to form a dibasic soap, and the reaction of one mole of the latter with two moles of ferric hydroxide to form a ferroxy chain unit of alternating iron and oxygen atoms having two hydroxyl groups at each terminus and having an acid radical of the group indicated attached to the central iron atom. Ferroxy pigment formation is visualized as the polymerization of the above-indicated ferroxy chain units through the terminal hydroxyl groups. Lesser amounts of such acid or ammonium soap can also be reacted with ferric hydroxide in this type of statistical reaction to form similar polymers having more alternating iron and oxygen atoms and fewer substituted acid radicals.

It has now been discovered that a somewhat similar reaction takes place between ferric hydroxide and polymerized or oxidized and polymerized unsaturated monocarboxylic acid radicals, to give new products, pigmentary in nature, having a ratio of up to one polymerized or oxidized, polymerized, unsaturated, monocarboxylic acid radical to three iron atoms.

In making these new compounds, ferric hydroxide as slurry is reacted with the indicated acid or its ammonium soap by heating under reflux with stirring, not more than one mole of acid or ammonium soap, as carboxyl, being reacted with three moles of ferric hydroxide. Stirring and refluxing are continued until the reaction is complete, the time required therefor being about two hours. By polymerized, or polymerized, oxidized, unsaturated, monocarboxylic acid or ammonium soap is meant a bodied product derived from an unsaturated monocarboxylic acid, and substitution products thereof, in which the substituents are non-reactive under pigment-forming conditions of reaction, by polymerizing or oxidizing and polymerizing so that the product thereby obtained is increased in viscosity by a factor of about two at least, as compared with the starting material. The upper limit is the gelation point of the polymerized or oxidized, polymerized unsaturated acid product.

The molar ratio of polymerized or oxidized, polymerized unsaturated acid product to ferric hydroxide can be varied considerably. The minimum amount of acid or its ammonium soap reacted with ferric hydroxide approaches zero. As the amount of acyl substituent in the polymeric iron products is increased to a maximum of one mole per three moles of iron, products having the most generally desirable pigmentary physical properties are obtained. All the products of this invention are insoluble, or only very slightly soluble in organic solvents, and insoluble in water, and give translucent films from organic coating compositions which have a reddish-brown color.

The following examples are given to illustrate the invention:

Example 1

To 46 grams of dehydrated castor oil fatty acids was added 0.46 gram (1%) of boron trifluoride dietherate, and the mixture was heated to 100° C. and blown with air for three hours. The viscosity of the oxidized polymerized dehydrated castor oil fatty acids was then double that of the raw oil. It was added to a ferric hydroxide aqueous slurry prepared by precipitation from 384 grams of a 40% aqueous solution of $FeCl_3$ by means of 220 mls. concentrated ammonia dissolved in 1 liter of water. The mixture was heated to boiling and refluxed for two hours with continuous stirring. Thereafter, the reaction product was filtered, washed free of salts with water and dried at 60° C. The resultant product was a brownish-red pigmentary powder which was insoluble in organic solvents and produced a reddish translucent film when used as a pigment with organic coating compositions.

Example 2

To 46 grams of dehydrated castor oil fatty acids was added 1% by weight of $BF_3$-dietherate, and the mixture was heated to 100° C. and blown with air for four hours. The viscosity of the bodied dehydrated castor oil fatty acids was 2.5 times that of the raw oil. The oxidized, polymerized, fatty acid was added to a ferric hydroxide slurry prepared by precipitation from 394 grams 40% aqueous $FeCl_3$ solution by means of 240 mls. concentrated ammonia diluted with 1 liter of water. The procedure of Example 1 was thereafter followed, and a similar product was obtained.

Example 3

Castor oil fatty acids to which was added 4% by weight of ditertiary butyl peroxide was blown with air for 15 hours at 75° C. which increased the viscosity from 2.8 poises to 5.4 poises. 46 grams of such blown castor oil fatty acids was added to a ferric hydroxide slurry prepared by precipitation from 394 grams 40% aqueous $FeCl_3$ solution by means of 220 mls. concentrated ammonia diluted with 1 liter of water. The reaction medium was continuously stirred while heated to boiling, and was refluxed for two hours. The reaction product was then filtered, washed free of salts and dried at 60° C.

Example 4

The procedure of Example 3 was repeated, using castor oil fatty acids which had been blown for 6 hours in the presence of 5% by weight of benzoyl peroxide at 75° C., which gave a blown castor oil fatty acid having a viscosity of 6.8 poises, compared with a starting value of 2.8 poises.

Example 5

The procedure of Example 3 was repeated, using a blown castor oil fatty acid having a viscosity of 16 poises, prepared by blowing castor oil fatty acid with air at 150° C. for 3 hours.

Example 6

46 grams of the blown castor oil fatty acids of Example 3 was added to a ferric hydroxide slurry prepared by precipitation from 788 grams 40% aqueous $FeCl_3$ solution by means of 440 mls. concentrated ammonia diluted with 2 liters of water. The reaction medium was heated to boiling with stirring, and was refluxed for two hours. The reaction product was filtered off, washed free of salts and dried at 60° C.

Example 7

46 grams of the blown castor oil fatty acids of Example 4 was added to a ferric hydroxide slurry prepared by precipitation from 591 grams of 40% aqueous $FeCl_3$ solution by means of 330 mls. concentrated ammonia diluted with 1.5 liters of water. With continuous stirring, the reaction medium was heated to boiling, and was refluxed for two hours. The product of reaction was filtered off, washed free of salts and dried at 60° C.

Example 8

50 grams of bodied castor oil having a viscosity of 740 poises was saponified with KOH and the resulting soap was neutralized with HCl to pH 7. The resulting acid was added to a ferric hydroxide slurry prepared by precipitation from 394 grams of 40% aqueous $FeCl_3$ solution by means of 240 mls. concentrated ammonia diluted with 1 liter of water. The mixture was heated to boiling with continuous stirring, and refluxing was continued for two hours with continued stirring. Thereafter, the reaction product was filtered, washed free of salts with water, and dried at 60° C. The resultant product was a brownish red pigmentary powder which was only slightly soluble in organic solvents and produced a reddish brown translucent film when used as a pigment with organic coating compositions.

Example 9

The procedure of Example 8 was repeated, using a dehydrated castor oil which had been polymerized to a viscosity of 42.2 poises by heating at 310° C. for 90 minutes under $CO_2$, so that polymerization without oxidation took place. A similar pigmentary product was thereby obtained.

Example 10

The procedure of Example 8 was repeated, using an air bodied, alkali-refined linseed oil heated at 279° C. to a viscosity of 115 poises, compared with an original viscosity of 0.23 poises.

Example 11

The procedure of Example 8 was repeated, using a vacuum bodied, alkali-refined linseed oil, heated at 279° C. to a viscosity of 138 poises.

Example 12

The procedure of Example 8 was repeated, using a tung oil, air-bodied at 232.2° C. for three and one-fourth hours to a viscosity of 125 poises.

Example 13

The procedure of Example 8 was repeated, using an oiticica oil, bodied in air at 254° C. for three and one-half hours to a viscosity of 145 poises.

Example 14

The procedure of Example 8 was repeated, using an oiticica oil heat bodied under $CO_2$ at 232.2° C. for three and one-fourth hours to a viscosity of 92.5 poises.

Example 15

The procedure of Example 8 was repeated, using 21.5 grams of bodied castor oil having a viscosity of 170 poises and 27.7 grams of coconut oil fatty acids.

Example 16

44 grams of soybean oil fatty acids was added to a ferric hydroxide slurry prepared by precipitation from 405 grams of 40% aqueous $FeCl_3$ solution by means of 230 mls. concentrated ammonia diluted with 900 mls. water. With continuous stirring, 30 mls. of 30% $H_2O_2$ was added dropwise, and the reaction mixture was then heated to boiling. Refluxing with continued stirring was continued for two hours, when the product was filtered off, washed and dried at 60° C.

Example 17

The procedure of Example 16 was repeated, with the addition of 1 gram $CuSO_4 \cdot 5H_2O$ as an oxidation catalyst. A satisfactory pigment was subsequently recovered.

Example 18

The procedure of Example 8 was repeated, using an air-bodied fish oil, prepared by heating California sardine oil at 290.6° C. until a product was obtained having a viscosity of 148 poises.

Example 19

Styrenated oleic acid having an acid number of 68.5 and prepared by the method of Powers, Ind. Eng. Chem. volume 42, page 2096 (1950), 129 grams, was added to a ferric hydroxide slurry prepared by precipitation from 405 grams of 40% aqueous $FeCl_3$ solution by means of 230 mls. concentrated ammonia diluted with 1 liter of water. With continuous stirring, the mixture was heated to boiling and refluxed for two hours. Thereafter, the reaction product was filtered off, washed with water, and dried at 60° C.

Example 20

The procedure of Example 19 was repeated, using 65 grams of styrenated oleic acid. A satisfactory pigment was subsequently recovered.

Example 21

92 grams of the polymerized, oxidized, dehydrated castor oil fatty acids of Example 1 was added to a ferric hydroxide slurry prepared by precipitation from 384 grams of a 40% aqueous solution of $FeCl_3$ by means of 250 mls. concentrated ammonia diluted with 1 liter of water. The mixture was heated to boiling and refluxed for two hours with continuous stirring. The reaction product was filtered off, washed free of salts with water, and dried at 60° C.

Example 22

92 grams of the polymerized, oxidized, dehydrated castor oil fatty acids of Example 2 was substituted in the procedure of Example 21, with similar results.

Example 23

The procedure of Example 21 was repeated, substituting 92 grams of the polymerized, oxidized, castor oil fatty acids of Example 3.

Example 24

The procedure of Example 21 was repeated, substituting 92 grams of the polymerized, oxidized, castor oil fatty acids of Example 4. A product similar to that of Example 23 was obtained.

Example 25

To a ferric hydroxide slurry prepared by precipitation from 405 grams of 38% aqueous $FeCl_3$ solution by means of 230 mls. concentrated ammonia diluted with 1 liter of water, was added 153 grams of aqueous ammonium polyacrylate solution, 9.8 solids, having a viscosity of 2 poises. The mixture was heated to boiling with continuous stirring, and refluxed for three hours. Thereafter, the reaction product was filtered, washed free of chloride with water, and dried at 55° C.

The resulting pigment was a brownish-red powder.

I claim:

1. As new compounds, polymers of ferric hydroxide in which hydroxyl is substituted at least in part and not exceeding one hydroxyl group per three atoms of iron by a member of the group consisting of: polymers of unsaturated, aliphatic, monocarboxylic acid radicals; polymers of oxidized, unsaturated, aliphatic, monocarboxylic acid radicals; and mixtures thereof.

2. Method of making a high molecular weight, complex iron compound which comprises refluxing ferric hydroxide in an aqueous reaction medium with a polymeric compound having the empiric formula $R_1OR_2$, in which $R_1$ is a member of the group consisting of $NH_4$ and H and $OR_2$ is an acid radical of a member of the group consisting of polymers of unsaturated, aliphatic, monocarboxylic acids; polymers of oxidized, unsaturated, aliphatic, monocarboxylic acids; and mixtures thereof, and separating the iron compound formed from the reaction medium, the molar ratio of such acid radical to ferric hydroxide not exceeding 1:3.

3. Method of claim 2, in which polymers of oxidized, dehydrated castor oil fatty acids are used.

4. Method of claim 2, in which polymers of oxidized, soya fatty acids are used.

5. Method of claim 2, in which polymers of oxidized, linseed oil fatty acids are used.

6. Method of claim 2, in which polymers of oxidized, fish oil fatty acids are used.

7. Method of claim 2, in which polymers of oxidized, oiticica oil fatty acids are used.

References Cited in the file of this patent

UNITED STATES PATENTS

| Number | Name | Date |
|---|---|---|
| 2,389,873 | Schiller | Nov. 27, 1945 |
| 2,445,770 | Fischer | July 27, 1948 |
| 2,575,347 | Kumins et al. | Nov. 20, 1951 |